June 12, 1928. 1,673,747

G. E. HOWARD

BLOWING GLASSWARE

Filed May 8, 1923 2 Sheets-Sheet 1

INVENTOR
George E. Howard
By Ray, Totten & Brown
Attorneys

June 12, 1928. 1,673,747
G. E. HOWARD
BLOWING GLASSWARE
Filed May 8, 1923   2 Sheets-Sheet 2

INVENTOR
George E. Howard
By Kay, Totten & Brown
Attorneys

Patented June 12, 1928.

1,673,747

UNITED STATES PATENT OFFICE.

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE.

BLOWING GLASSWARE.

Application filed May 8, 1923. Serial No. 637,521.

My invention relates to the manufacture of blown glassware, and it has special reference to the operation of delivering air into the glass while the glass is being blown to form a parison or a finished article.

One object of my invention is to improve the distribution of the glass in the walls of the ware, this object being attained, in general terms, by admitting the air to the interior of the glass in a succession of short and discontinuous puffs separated by intervals of reduced pressure. This reduced pressure may be such as to contract the partially blown glass by suction, or it may be normal atmospheric pressure, in which case the expansion of the glass is merely checked. Or, if desired, the air pressure may be reduced so as to keep a partial pressure on the glass and thereby expand it more slowly.

Another object of my invention is to shorten the time required for completing a blown glass article, particularly in making paste-mold ware, this object being attained by causing air to pass into and out of the interior of the article throughout the blowing operation, or at least during a substantial portion of the blowing operation, thereby accelerating the removal of heat from the article.

Figure 1:
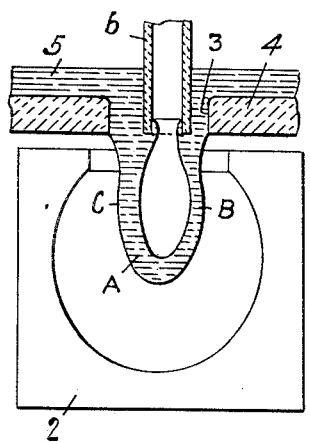
Figure 2:
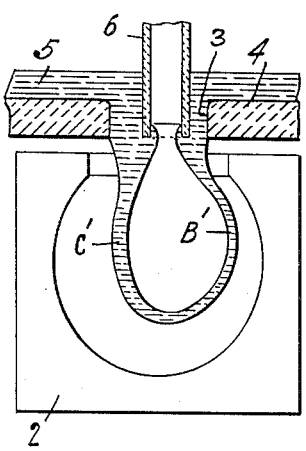
Figure 3:
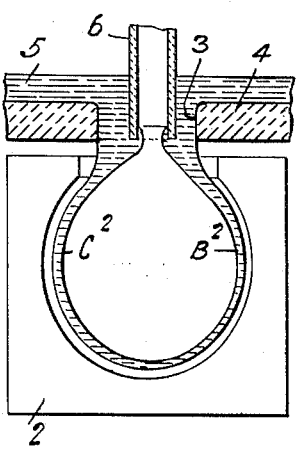
Figure 4:
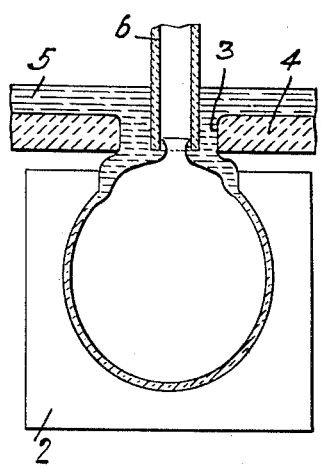

The accompanying drawing shows, by way of example, two methods of carrying out my invention. It will be understood that my invention is not restricted to the precise blowing apparatus and mold-forms shown herein, and that my invention may be employed either in hand-blowing or in automatic blowing machines. All of the figures of the drawing are diagrammatic vertical sectional views which show a source of glass, a blow pipe and a mold. Fig. 1 shows the condition of the glass shortly after the blowing operation commences, if one side of the glass bubble is thicker than another side; Fig. 2 shows the continued blowing of the bubble shown in Fig. 1 after an interval of reduced pressure, and an approach to equalization between the thickness of the opposite sides of the bubble; Fig. 3 shows the same bubble enlarged and further restored to symmetry by interrupting the blowing and then applying another puff of air; Fig. 4 shows the article completely blown to fill the mold and Figs. 5 to 8 are similar progressive views showing the use of a double blow pipe for causing air to pass into and also out of the article during or after the blowing operation, or both before and after the article is fully blown up in the mold.

When a parison of hot plastic glass is blown into a hollow glass article, the parison has a chilled skin of colder and less plastic glass on its outside surface, and in addition frequently has a similar chilled skin on its inside surface, depending on how the parison was initially formed. This chilled skin serves to hold the shape of the parison after it has been removed from its forming means, preventing the hotter and more plastic interior from running out of shape. Heat transmitted from this hotter interior of the parison gradually reheats the skin so that it becomes more plastic.

If it should happen that the glass is unsymmetrically distributed in the parison so that its walls are initially of uneven thickness, then the thick portions will not expand or blow out as rapidly as the thin portions, and by the existing processes of continuous blowing, this will result in an article whose walls are of uneven thickness.

According to my present invention, the bottle or other article to be blown is expanded in its mold in two or more stages by a regulated succession of puffs, with definite and regulated intervals between them, all adapted in number, duration and frequency to the size, weight, form and other characteristics of the various kinds of ware to be blown. During each interval of rest the thicker portions of the wall of the parison, containing more and hotter glass than the thinner portions, heat through and soften their chilled skins more than the thinner portions do, and are, therefore, stretched out more than the thinner portions by the succeeding puff. Thus, during each interval the different portions of the wall of the article tend to soften in proportion to their relative thickness, and this tendency in connection with repeated blowing puffs reduces the wall to the desired uniformity of thickness, constituting a self-correcting process.

A further novel feature of this part of my invention is that the successive puffs of air are of short duration and are separated by intervals which are also short, the result being that the glass is expanded quickly and in a considerable number of small increments, each of which is so slight that but little distortion of the glass is possible, even though the glass may have been badly distributed initially. Such slight distortions are quickly and progressively self-corrected by reheating in the intervals of rest or suction, and by the later puffs of air, in the manner described above.

The action just described is illustrated in an exaggerated way in Figs. 1 to 4 of the drawing. In these figures the numeral 2 indicates a blow-mold located below a discharge opening 3 in a receptacle 4 containing molten glass 5. A blow pipe 6 extends into or below the outlet 3. This particular arrangement, wherein a blow pipe is arranged to blow out a bubble of glass through an opening in a receptacle, is described and claimed in my prior Patent 1,592,299, granted July 13, 1926, and forms no essential part of my present invention. The receptacle 4 and blow pipe 6 are intended to represent any means by which a mass of glass is brought into a mold for blowing. The blow pipe 6 is connected to a source of air under pressure, and also, if desired, to a source of suction, suitable valves being provided to apply the pressure and suction intermittently. Since these arrangements form no specific part of my invention, it has not been considered necessary to illustrate them herein. It will be noted that the blow pipe 6 in Figs. 1 to 4 is somewhat off-center with respect to the discharge outlet 3. This has been selected as an example of the conditions which cause uneven distribution in the glass.

The glass bubble as it begins to form is shown at A, Fig. 1, and it will be seen that the side wall B of this bubble is thinner than the opposite side wall C. Fig. 2 shows the condition which is produced if the first puff of air is interrupted and another puff is applied after a reheating interval. The side wall C in Fig. 1, being thicker than the opposite side wall B, offers greater resistance to the expanding action of the air and therefore may be blown out only to the extent shown at C′, Fig. 2, while the opposite thinner wall B of Fig. 1 is expanded to a greater extent, as shown at B′, Fig. 2. There is, however, less difference between the thickness of the walls B′ and C′ than between the walls B and C in Fig. 1. If the blowing is again interrupted and the glass is given another opportunity to reheat, the chilled skin on the thicker wall C′ will be reheated, and the wall softened, more thoroughly than the skin on the thinner wall B′, because of the greater mass of still molten glass within the wall C′. Another puff of air delivered through the blow pipe 6 will stretch the thicker and softer wall C′ more readily than the thinner and harder wall B′, and may therefore blow the bubble to somewhat the condition shown in Fig. 3, where the walls $B^2$ and $C^2$ have become nearly of the same thickness and are approximately symmetrical within the mold cavity.

This equalizing effect is assisted by the rounded shape of the wall B′ Fig. 2, and the comparatively flat shape of the wall C′. The rounded or dished shape in itself offers more resistance to change of shape than the flatter wall, and the next puff of air therefore expands the wall C′ more readily than the wall B′.

Another interval of rest, followed by another puff of air through the blow pipe 6, may bring the glass to its final shape within the mold, and its action will again be more pronounced on the thicker wall of the bubble, so that the finished globe or other article may be given a nearly symmetrical distribution throughout, as indicated on Fig. 4, even though the distribution of the initial bubble may be very uneven.

Figs. 1 to 4 of the drawing illustrate an exaggerated condition of unevenness which, for convenient illustration, is assumed to be corrected by blowing in four puffs separated by three intervals of rest. In actual practice, the distribution of the glass will seldom be as uneven as that shown on the drawing, and I prefer to apply the air in a considerable number of puffs, each of which blows out the article to a small extent only, and therefore permits the necessary reheating to take place in very brief intervals between puffs. In these intervals the blow pipe 6 may be opened to the outer air, or it may be connected to a source of suction, so as to cause slight contractions of the bubble during the reheating stages. These contractions tend to assist in the equalization of the glass because they give room in the mold for a greater number of air-puffs for each article, and consequently a greater number of reheating intervals, than when the expansion of the glass is merely interrupted between the puffs.

The puffing periods and the intervals of rest or suction may be of about the same length; or the puffing periods may be longer or shorter than the intervals, as may be required in particular cases.

Figures 5 to 8 illustrate that part of my invention whereby the time of completing blown glass articles is shortened by passing air through the article in connection with the blowing operation, thereby releasing or withdrawing heated air from the interior of the article. The speed with which glassware can be blown is limited by the time necessary to "set up" the ware by hardening its inner and outer surface portions sufficiently to support the inner portions which may be still plastic. The outer surface of the article is hardened by contact with the mold, and the longer the glass remains in contact with the mold the harder its outer skin becomes. At the same time, the inner surface of the article is cooled by contact with the air introduced for blowing. When the inner and outer surfaces have hardened sufficiently to preserve the shape of the article it can be taken from the mold, but in the case of very thick glass articles the surfaces may become reheated by the molten interior of the glass to such an extent that the ware may sag after standing in the open air for some time.

In the ordinary blowing operation the interior of the ware cools more slowly than the outside of the ware, because the outside radiates or conducts heat to the surrounding mold, while the inside of the ware can radiate heat only through the outer portions of the ware, and is in contact with a stagnant mass of air whose specific heat capacity is extremely low, and which, therefore, has very little cooling power.

According to this part of my present invention, I cause air to pass into and out of the interior of the article while it is being blown, and, if desired, after the article is completely blown up in the mold. For this purpose I may employ a double blow pipe consisting of a tube extending through a somewhat larger tube, so as to provide an annular passage surrounding the inner tube. The blowing air may be delivered through the outer tube and the heated air withdrawn through the inner tube, or vice versa, and suitable valves or other means are provided for maintaining the necessary differential pressures for expanding or contracting the glass during the blowing operation, while permitting air to stream through the interior of the article whenever desired. The air withdrawn from the interior of the article rapidly carries away heat, and new air is enabled to reach the glass and absorb more heat, thus cooling the article progressively and positively. This greatly hastens the cooling of the glass, as compared with the ordinary blowing process where the comparatively still air within the article absorbs a relatively small amount of heat, and that very slowly.

This phase of my invention may or may not be employed along with the discontinuous puffing operation described above, but for best results I prefer that both operations be carried out together, in which case the glass is expanded in discontinuous puffs separated by intervals of rest or of suction, the air being caused to pass into and out of the interior of the glass whenever desired during or after the blowing operation.

Figure 5:
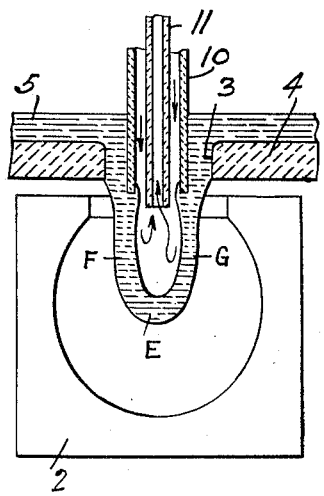

Figure 5 of the drawing shows a mold 2, a discharge opening 3 in a receptacle 4, and a glass supply 5, as in the first four figures. The blow pipe shown in Fig. 5 consists of an outer tube 10 and an inner tube 11 which, as shown, projects somewhat below the lower end of the outer tube 10. The tubes 10 and 11 are to be connected to suitable sources of pressure and suction, with valves or other suitable means, not shown, to produce the desired pressure differentials while permitting air to be continuously delivered to one of the tubes and continuously withdrawn from the other tube. The glass descends through the outlet 3 and is blown into a bubble E, Fig. 5, having one wall F somewhat thicker than the opposite wall G. The air may descend in the outer tube 10, as shown by the arrows, and may be drawn out through the inner tube 11, but at a somewhat slower rate, so that there is a sufficient differential pressure to expand the glass.

Figure 6:
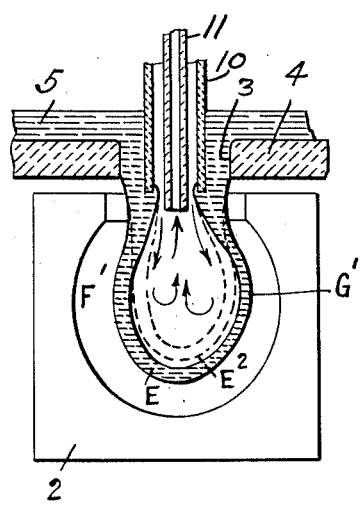

Fig. 6 shows the same construction as Fig. 5, the glass bubble being shown somewhat enlarged and the wall G' being blown out somewhat farther than the wall F'. If the suction applied to the inner tube 11 is now increased, so as to produce sub-atmospheric pressure within the bubble, the walls of the bubble will contract slightly, assuming somewhat the position shown in dotted line at $E^2$, Fig. 6.

Figure 7:
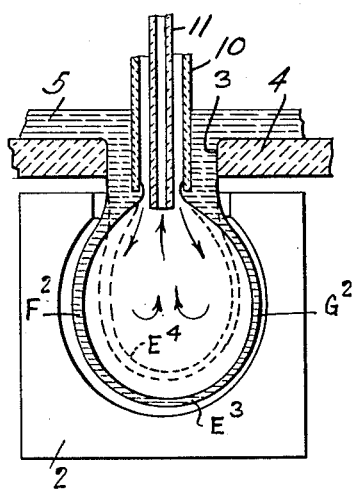

A further increase in air-pressure may expand the bubble into the full-line shape shown at $E^3$, Fig. 7, where the wall $G^2$ is still somewhat thinner than the opposite wall $F^2$. A further suction pull may then be employed to contract the bubble to somewhat the shape shown at $E^4$, Fig. 7.

Figure 8:
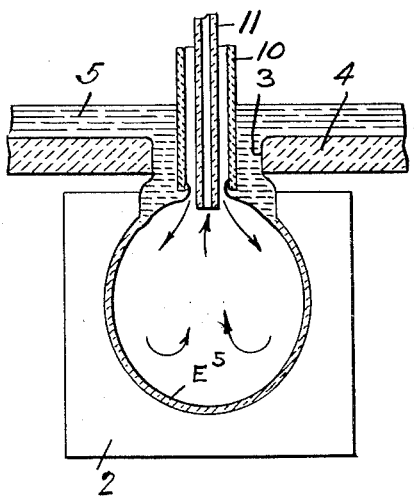

A final increase in air pressure brings the globe or other article to the final form shown at $E^5$, Fig. 8. The air may continue to stream through the interior of the article, as shown by the arrows, in order to cool the glass more rapidly and to insure the proper set-up of the article when it is removed from the mold.

The system illustrated in Figs. 5 to 8, like that of Figs. 1 to 4, is exaggerated as to the uneven distribution of glass and as to the successive positions assumed by the glass in the puffing operation. In practice, a greater number of alternate puffs and suction pulls is preferably employed, so as to provide a considerable number of reheating periods.

When the above-described double blow pipe or an equivalent arrangement is employed for passing air into and out of a glass article, stream effects or local currents are set up within the article, and these currents are particularly useful in cooling the glass if the cold air is introduced through the outer tube 10 and the heated air is withdrawn, or allowed to escape, through the inner tube 11, as shown by the arrows on the drawing. In that case, much of the cold air will stream down along the walls of the glass article and the heated air will be withdrawn from the central portion of the space within the article, thus subjecting the glass to constant streams of cool air.

The pressure and vacuum conditions in the interior of the ware during blowing may be regulated by increasing the amount of air in the incoming pipe over the amount taken out through the outgoing pipe and thus building up pressure, or by taking out the air more rapidly than it is introduced, and thus reducing the pressure. When it is not desired to apply suction within the glass in the intervals between expansions, the air may be allowed to escape from the outgoing pipe to the outer air, in which case the differential pressure necessary to expand the ware may be produced by increasing the air pressure at the inlet or by partially closing the air outlet. In either case a considerable volume of air may be continuously passed into and out of the interior of the ware without affecting the pressure, and the cooling thus produced on the interior surface of the glass is very rapid.

Air may be caused to stream through the article during the blowing operation, and the flow of air may be shut off after the article is fully blown, the article being then left in the mold for a short time in order to cool sufficiently to be handled. I prefer, however, to continue the flow of air until the article is ready to be taken out, so as to fully utilize the cooling effect of the air.

The use of air currents in the manner just described is particularly advantageous in paste-mold work, because the ware blown in a paste-mold cools more slowly than in an iron mold, for the reason that the surface of the mold engaging the hot glass is usually composed of cork and linseed oil, and this mold surface is a poor conductor of heat. Also, paste-molds are immersed in water after each blowing operation, and some moisture remains on the inside surface of the mold, forming a film of vapor between the mold and the glass, which film is a poor conductor of heat. For these reasons the cooling of paste-mold ware depends largely on the chilling of the interior surface, and any increase of speed in this respect greatly increases the speed of production.

Another advantage of my present invention is that the pressure of the air used for blowing need not be so delicately adjusted as in the ordinary blowing operation. When the air is supplied into a dead space, as in the ordinary blowing operation, a very minute quantity of air is used, and the proper adjustment of this air supply requires delicate and accurate apparatus. Also, when a small quantity of dead air is present this air heats and expands, thus adding a pressure which must be taken into account in adjusting the air supply. These reasons for delicate adjustment are not present when the air is caused to sweep through the interior of the ware, as in my present invention, and the design and adjustment of valves or other attachments for controlling the air supply may therefore be greatly simplified.

As stated above, my invention is not restricted in any way to the precise constructions herein selected for illustration, and it will be understood that no limitations are to be imposed upon my invention except such as are indicated in the appended claims.

I claim as my invention:

1. The method of blowing glassware that comprises enclosing a suspended mass of glass in a mold, blowing air into said mass in a succession of discontinuous puffs to expand the glass into contact with the walls of said mold, and admitting suction to the interior of said mass between said puffs.

2. The method of blowing glassware that comprises blowing air into a mass of plastic glass in a plurality of discontinuous puffs, and producing sub-atmospheric pressure within said glass between said puffs.

3. The method of blowing glassware that comprises blowing air into a mass of plastic glass in a succession of discontinuous puffs separated by intervals of suction within the glass.

4. The method of blowing glassware that comprises partially expanding a mass of plastic glass in a mold by means of air pressure, partially contracting the said glass, and repeating the said operations until the glass fills the mold.

5. The method of blowing glassware in molds that comprises the step of simultaneously passing streams of air into and out of the interior of the glass to expand it before the glass has fully solidified, thereby hastening the cooling of the glass.

6. The method of blowing glassware that comprises the step of simultaneously passing air into and out of the interior of the glass while the glass is being expanded in a mold.

7. The method of blowing glassware that comprises the step of simultaneously passing air into and out of the interior of the glass while the glass is being expanded in a mold and also after the glass has been expanded to fill the mold, thereby hastening the cooling of the glass.

8. The method of blowing glassware that comprises the step of simultaneously passing air into and out of the interior of the glass after the glass has been expanded to fill the mold, and thereby hastening the cooling of the glass.

9. The method of blowing glassware that comprises expanding a mass of glass in a single mold by a series of discontinuous puffs, and subsequently simultaneously passing air into and out of the interior of the glass in a continuous stream while being so expanded.

10. The method of blowing glassware that comprises the operations of expanding a mass of glass from a mold by a series of discontinuous puffs, and subsequently simultaneously passing air into and out of the interior of the glass during and after the said expanding operation.

11. The method of blowing glassware that comprises the operations of expanding a mass of glass in a single mold by a series of discontinuous puffs of air separated by intervals of reduced pressure, and then simultaneously passing air into and out of the interior of the glass during the said expanding operation.

12. The method of blowing glassware that comprises the operations of expanding a mass of glass in a single mold by a series of discontinuous puffs of air separated by intervals of reduced pressure, and causing a stream of air to sweep through the interior of the glass during and after the said expanding operation at alternate differential pressures.

13. The method of blowing glassware that comprises the operations of expanding a mass of glass in a mold by a series of discontinuous puffs separated by intervals of suction within the glass, and causing a stream of air to sweep through the interior of the glass during the said expanding operation.

14. The method of blowing glassware that comprises applying blowing pressure to the interior of a hollow article of plastic glass contained in a mold and causing air to pass into and out of the interior of said article at a pressure substantially equal to said blowing.

15. The method of blowing glassware that comprises expanding a mass of glass in a mold and causing air to pass into and out of the interior of the glass in such way as to cool the glass while said glass is being expanded.

16. The method of blowing glassware that comprises expanding a mass of glass in a mold and, before the glass has solidified, and while still expanding, passing into and out of its interior a substantial and controllable current of air in such way as to cool the glass.

17. The method of blowing glassware that comprises expanding a mass of glass to contact with the interior of a mold and, before the glass has solidified, passing air through an annular channel into the interior of said glass and removing air through an outlet within said annular channel.

18. The method of blowing glassware that comprises expanding a mass of glass to contact with the interior of a mold and, before the glass has solidified, passing air through an outer channel into the interior of said glass and removing air through a channel extending through said outer channel.

19. Apparatus for blowing glassware comprising a mold, a blowpipe for introducing air into said mold, and an outlet pipe for conducting air from the interior of the glass within said mold.

20. Apparatus for blowing glassware comprising a mold and a double blow pipe having channels respectively adapted to conduct air into and out of the interior of a glass article while said article is being expanded to contact with the interior of said mold.

21. Apparatus for blowing glassware comprising a mold and a double blowpipe composed of two concentric tubes adapted respectively to conduct air into and out of the interior of a glass article while said article is being expanded to contact with the walls of said mold.

22. The method of blowing glassware that comprises expanding a mass of glass to contact with the interior of a mold, before the glass has solidified, passing air into the interior of the glass through one channel and removing said air through another channel having a cross-sectional area less than that of said first-mentioned channel.

23. The method of blowing glassware that comprises expanding a mass of glass in a mold by passing air into the interior of the glass and simultaneously allowing a certain proportion of said air to escape to the atmosphere.

In testimony whereof I, the said GEORGE E. HOWARD, have hereunto set my hand.

GEORGE E. HOWARD.